(12) United States Patent
Zehavi

(10) Patent No.: US 6,496,543 B1
(45) Date of Patent: *Dec. 17, 2002

(54) METHOD AND APPARATUS FOR PROVIDING HIGH SPEED DATA COMMUNICATIONS IN A CELLULAR ENVIRONMENT

(75) Inventor: Ephraim Zehavi, Haifa (IL)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/741,320

(22) Filed: Oct. 29, 1996

(51) Int. Cl.[7] ................................................ H04L 27/04
(52) U.S. Cl. ...................... 375/295; 375/377; 375/358
(58) Field of Search .................................. 375/377, 265, 375/358, 295; 370/341; 455/422, 436

(56) References Cited

U.S. PATENT DOCUMENTS

| | | | |
|---|---|---|---|
| 3,310,631 A | 3/1967 | Brown | 179/15 |
| 3,715,508 A | 2/1973 | Blasbalg | 179/15 BC |
| 4,135,059 A | 1/1979 | Schmidt | 179/15 BS |
| 4,220,821 A | 9/1980 | Lucas | 370/110 |
| 4,256,925 A | 3/1981 | Gooke | 370/104 |
| 4,291,406 A | 9/1981 | Bahl et al. | 371/44 |
| 4,298,979 A | 11/1981 | Dobyns et al. | 370/104 |
| 4,301,530 A | 11/1981 | Gutleber | 370/18 |
| 4,319,353 A | 3/1982 | Alvarez, III et al. | 370/104 |
| 4,322,845 A | 3/1982 | Fennel, Jr. et al. | 370/104 |
| 4,339,818 A | 7/1982 | Gruenberg | 370/112 |
| 4,369,434 A | 1/1983 | Mueller | 340/347 DD |

(List continued on next page.)

FOREIGN PATENT DOCUMENTS

| | | | |
|---|---|---|---|
| EP | 0412583 | 3/1986 | H04B/1/56 |
| EP | 0418865 | 9/1990 | H04L/7/04 |
| EP | 0444592 | 2/1991 | H04B/7/212 |
| GB | 2022365 | 5/1979 | H04Q/7/04 |
| GB | 2182528 | 10/1985 | H04J/3/00 |

(List continued on next page.)

OTHER PUBLICATIONS

Matsuoka, et al. "Adaptive Modulation System with Variable Coding Rate Concatenated Code for High Quality Multi–Media Communication Systems" IEEE 1(conf 46) 487–491 (1996).

*Advanced Engineering Mathematics,* "Orthogonal Sets of Functions /4.7" Kreyszig, Erwin, pp. 186–190, John Wiley & Sons, Inc.

Primary Examiner—Temesghen Ghebretinsae
(74) Attorney, Agent, or Firm—Philip Wadsworth; Kent D. Baker; S. Hossain Beladi

(57) ABSTRACT

A method and apparatus for transmitting digital data in a cellular environment. Adjacent cells of the cellular system are prevented from simultaneously transmitting data. Because the noise from transmissions of adjacent cells is a primary source of interference, the transmission rate of power limited base stations can be dramatically increased when the noise from adjacent cells is eliminated. The transmissions to each subscriber station are made at a fixed transmission power level. However, the data rate of transmitted signals differs from one subscriber station to another depending the path loss differences. In a first exemplary embodiment, the data rate of transmissions to a subscriber station is determined by selecting an encoding rate for the transmitted signal while holding the symbol rate constant. In a second exemplary embodiment, the data rate of transmissions to a subscriber station is determined by selection a modulation format for the transmitted signal which directly changes the symbol rate of transmission to a subscriber station.

8 Claims, 7 Drawing Sheets

U.S. PATENT DOCUMENTS

| | | | | |
|---|---|---|---|---|
| 4,373,151 | A | 2/1983 | Houdard et al. | 329/104 |
| 4,383,315 | A | 5/1983 | Torng | 370/89 |
| 4,424,417 | A | 1/1984 | Chavey et al. | 179/2 E |
| 4,445,213 | A | 4/1984 | Baugh et al. | 370/94 |
| 4,455,649 | A | 6/1984 | Esteban et al. | 370/80 |
| 4,460,992 | A | 7/1984 | Gutleber | 375/19 |
| 4,472,815 | A | 9/1984 | Gutleber | 375/34 |
| 4,477,900 | A | 10/1984 | Gruenberg | 370/112 |
| 4,491,947 | A | 1/1985 | Frank | 370/94 |
| 4,494,232 | A | 1/1985 | Dambrackas et al. | 370/80 |
| 4,547,880 | A | 10/1985 | De Vita et al. | 370/91 |
| 4,562,572 | A | 12/1985 | Goldman et al. | 370/80 |
| 4,587,652 | A | 5/1986 | Goldman | 370/110.1 |
| 4,594,476 | A | 6/1986 | Freeman | 179/6.08 |
| 4,635,221 | A | 1/1987 | Kerr | 364/821 |
| 4,688,035 | A | 8/1987 | Gray et al. | 340/825.52 |
| 4,726,014 | A | 2/1988 | Goldman et al. | 370/58 |
| 4,730,340 | A | 3/1988 | Frazier, Jr. | 375/1 |
| 4,775,987 | A | 10/1988 | Miller | 375/38 |
| 4,813,040 | A | 3/1989 | Futato | 370/111 |
| 4,839,892 | A | 6/1989 | Sasaki | 370/95 |
| 4,870,642 | A | 9/1989 | Nohara et al. | 370/75 |
| 4,872,200 | A | 10/1989 | Jansen | 380/34 |
| 4,876,698 | A | 10/1989 | Boisson et al. | 375/25 |
| 4,884,263 | A | 11/1989 | Suzuki | 370/16 |
| 4,899,337 | A | 2/1990 | Hirai | 370/80 |
| 4,901,307 | A | 2/1990 | Gilhousen et al. | 370/18 |
| 4,930,118 | A | 5/1990 | Sugihara | 370/16 |
| 4,933,952 | A | 6/1990 | Albrieux et al. | 375/1 |
| 4,939,745 | A | 7/1990 | Kirimoto et al. | 375/1 |
| 4,965,796 | A | 10/1990 | Petty | 370/112 |
| 4,970,648 | A | 11/1990 | Capots | 364/424.06 |
| 5,003,533 | A | 3/1991 | Watanabe | 370/85.5 |
| 5,003,534 | A | 3/1991 | Gerhardt et al. | 370/94.1 |
| 5,022,046 | A | 6/1991 | Morrow, Jr. | 375/1 |
| 5,068,849 | A | 11/1991 | Tanaka | 370/85.5 |
| 5,101,501 | A | 3/1992 | Gilhousen et al. | 455/33 |
| 5,103,459 | A | 4/1992 | Gilhousen et al. | 375/1 |
| 5,107,377 | A | 4/1992 | Ballard | 360/40 |
| 5,115,429 | A | 5/1992 | Hluchyl et al. | 370/84 |
| 5,121,383 | A | 6/1992 | Golestani | 370/60 |
| 5,134,710 | A | 7/1992 | Akerberg | 455/54.1 |
| 5,136,586 | A | 8/1992 | Greenblatt | 370/110.4 |
| 5,168,575 | A | 12/1992 | Cizek et al. | 455/33.1 |
| 5,172,375 | A | 12/1992 | Kou | 370/95.3 |
| 5,179,549 | A | 1/1993 | Joos et al. | 370/17 |
| 5,212,684 | A | 5/1993 | MacNamee et al. | 370/24 |
| 5,212,687 | A | 5/1993 | De La Bourdonnaye | 370/84 |
| 5,216,503 | A | 6/1993 | Paik et al. | 358/133 |
| 5,231,649 | A | 7/1993 | Duncanson | 375/38 |
| 5,235,614 | A | 8/1993 | Bruckert et al. | 375/1 |
| 5,258,983 | A | 11/1993 | Lane et al. | 370/118 |
| 5,276,730 | A | 1/1994 | Cimini, Jr. et al. | 379/60 |
| 5,280,537 | A | 1/1994 | Sugiyama et al. | 375/1 |
| 5,293,640 | A | 3/1994 | Gunmar et al. | 455/33.1 |
| 5,305,308 | A | 4/1994 | English et al. | 370/32.1 |
| 5,349,580 | A | 9/1994 | Hester et al. | 370/84 |
| 5,351,240 | A | 9/1994 | Highsmith | 370/84 |
| 5,381,412 | A | 1/1995 | Otani | 370/84 |
| 5,400,328 | A | 3/1995 | Burren et al. | 370/79 |
| 5,414,796 | A | 5/1995 | Jacobs et al. | 395/2.3 |
| 5,416,787 | A | 5/1995 | Gilhousen et al. | 375/705 |
| 5,420,861 | A | 5/1995 | De La Bourdonnaye | 370/84 |
| 5,440,542 | A | 8/1995 | Procter et al. | 370/18 |
| 5,442,625 | A | 8/1995 | Gitlin et al. | 370/18 |
| 5,471,497 | A | 11/1995 | Zehavi | 375/200 |
| 5,537,410 | A | 7/1996 | Li | 370/84 |
| 5,566,175 | A | 10/1996 | Davis | 370/84 |
| 5,638,412 | A | * 6/1997 | Blakeney, II et al. | 375/377 |
| 5,733,502 | A | 3/1998 | Houdard | 370/18 |
| 5,950,124 | A | * 9/1999 | Trompower et al. | 455/422 |

FOREIGN PATENT DOCUMENTS

| | | | |
|---|---|---|---|
| GB | 2293947 | * 12/1995 | |
| GB | 2293947 | 4/1996 | |
| WO | 9107030 | 5/1991 | H04J/3/06 |
| WO | 92/22162 | * 12/1992 | |
| WO | WO 95/00821 | * 1/1995 | |
| WO | 9721294 | 6/1997 | |

* cited by examiner

METHOD AND APPARATUS FOR PROVIDING HIGH SPEED DATA COMMUNICATIONS IN A CELLULAR ENVIRONMENT

BACKGROUND OF THE INVENTION

I. Field of the Invention

The present invention relates to communication systems. More particularly, the present invention relates to a novel and improved method and apparatus for providing high speed data in a wireless cellular communication environment.

II. Description of the Related Art

As wireless communication technology has advanced, an increase in the demand for high speed data services in a wireless environment has grown dramatically. The use of code division multiple access (CDMA) modulation is one of several techniques for providing digital wireless transmission that is well suited for the transmission of digital data. Other methods of digital wireless transmission include time division multiple access (TDMA) and frequency division multiple access (FDMA).

However, the spread spectrum modulation technique of CDMA has significant advantages other digital modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. The method for providing digital wireless communications using CDMA modulation was standardized by the Telecommunications Industry Association (TIA) in TIA/EIA/IS-95-A Mobile Station-Base Station Compatibility Standard for Dual-Mode Wideband Spread Spectrum Cellular System (hereafter IS-95).

The current wireless communication systems can only accommodate relatively low transmission rates. In addition, most current wireless communication systems have not been optimized for the transmission of digital data, but rather have been optimized for the transmission of speech information. Therefore, there is a need in the industry for a method of providing high speed digital data in a wireless environment.

SUMMARY OF THE INVENTION

The present invention is a novel and improved method and apparatus for transmitting digital data in a cellular environment. In the present invention, adjacent cells of the cellular system are prevented from simultaneously transmitting data. Thus, if a first base station on one side of a cell boundary is transmitting, then a second base station on the other side of the cell boundary is silent throughout the transmission period of the first base station. Because the noise from transmissions of adjacent cells is a primary source of interference, the transmission rate of power limited base stations can be dramatically increased when the noise from adjacent cells is eliminated.

In the present invention, all transmissions from a base station are transmitted at a fixed power level and the transmissions to each subscriber station in a cell are transmitted in non overlapping bursts. Thus, when a base station is transmitting, its transmissions are directed to one subscriber station within the cell, allowing the full amount of available power to be used to transmit data to that subscriber station which maximizes the available data rate to the subscriber station.

For the sake of clarity, it should be noted that two separate but related rates are referred to herein. One is the information rate which refers to the rate of user generated information bits. The second is the transmission rate which is the rate of bits transmitted over the air.

When transmissions are made at a fixed power level, the amount of information that can be transmitted between the base station and the subscriber station varies with link budget factors which are well known in the art. The most significant link budget factor in a wireless communication system is the path loss between the base station and the subscriber station. The path loss is strong function of the distance between the base station and the subscriber station.

In the present invention, the transmissions to each subscriber station are made at a fixed transmission power level. However, the information rate of transmitted signals differs depending the distance between the subscriber station and the base station. In the first exemplary embodiment, the information rate of transmissions to a subscriber station is determined by selecting an encoding rate for the transmitted signal while holding the transmission rate constant. In the second exemplary embodiment, the information rate of transmissions to a subscriber station is determined by selecting a modulation format for the transmitted signal which directly changes the transmission rate of transmission to a subscriber station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
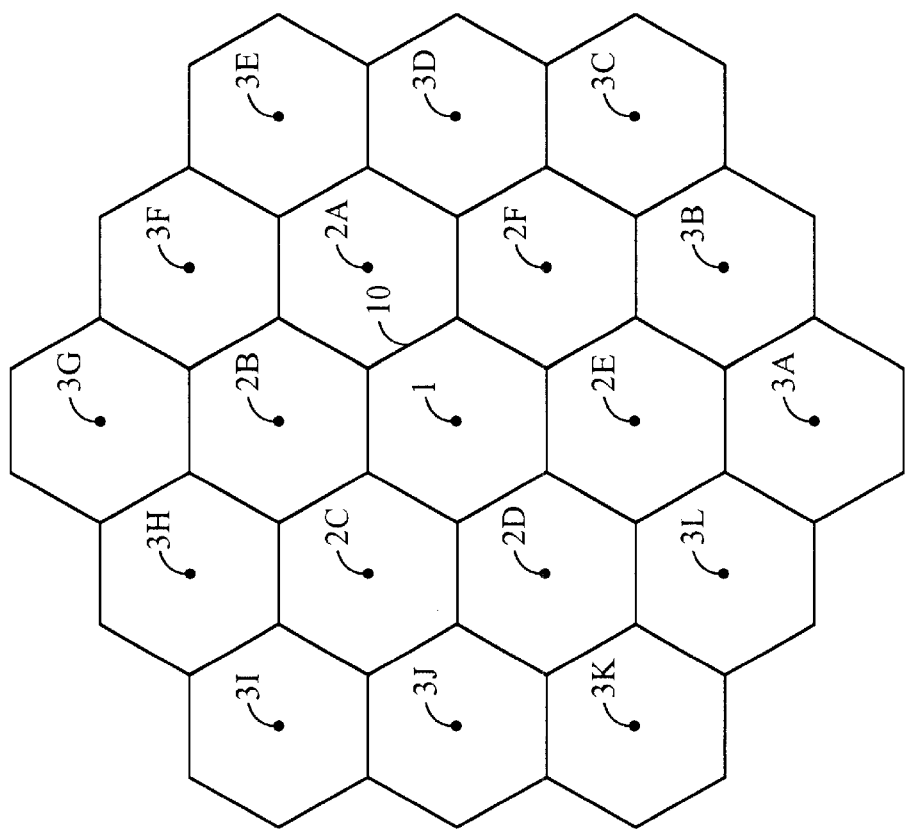
FIG. 1 is an illustration of a typical cell diagram for a geographical area.

In the following description, the same reference number is used to describe both the cell or area serviced by a base station and the base station itself. In the present invention, two adjacent cells are prohibited from simultaneously transmitting. Thus, in FIG. 1, when the base station 1 is transmitting then the base stations 2A–2F are prevented from transmitting. The noise ($N_0$) experienced by a base station transmitting in a cellular environment is described by equation (1) below:

$$N_0 = N_b + N_m + N_t + N_r \quad (1)$$

where $N_b$ is the noise from base stations in adjacent cells, $N_m$ is the interference from multipath reflections and $N_t$ is the thermal noise in the system and $N_r$ accounts for all other sources of noise.

The noise value ($N_0$) limits the amount of information that can be transmitted in a power limited wireless communication system. The present invention eliminates the noise from adjacent cells, $N_b$, by preventing any two adjacent cells from transmitting simultaneously. In addition, because a base station transmits to only one subscriber station at a time, all of its available energy can be used for the transmissions to that one subscriber station. Reducing the total noise ($N_0$) and increasing the power available for transmission to a given subscriber station greatly increases available the information rate for transmissions to the subscriber station.

Figure 2:
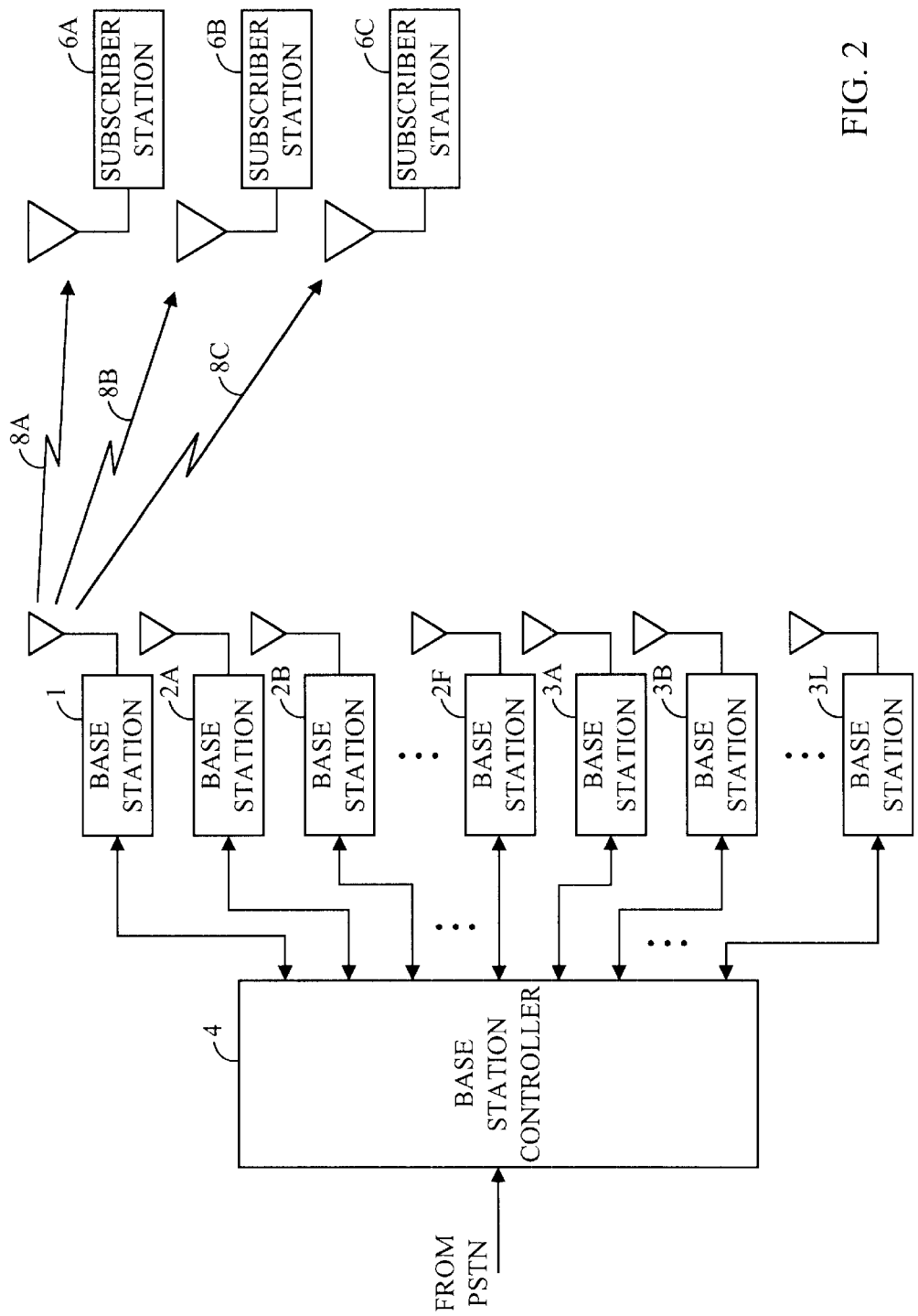
FIG. 2 is an illustration of the interrelation of the base station controller, the base stations and the subscriber stations.

Referring to FIG. 2, base station controller (BSC) 4 controls the operation of a large number of base stations within a geographical region. In the present invention, BSC 4 coordinates the transmission by base stations 1, 2A–2F and 3A–3L such that no two adjacent cells are simultaneously transmitting. In the present invention, BSC 4 sends a signal to a selected one of base stations 1, 2A–2F and 3A–3L, directing the selected base station to transmit for a predetermined time interval.

In a preferred implementation, the cells are grouped into sets of non adjacent cells wherein any of the cells within that set may simultaneously transmit. For example, a first set of non adjacent cells may consist of cells 2A, 2C, 2E, 3C, 3K and 3G. A second set of non adjacent cells may consist of cells 2B, 2D, 2F, 3A, 3E and 3I. In this preferred implementation, BSC 4 selects the subset of non adjacent cells which can transmit and any or all cells within that set of non adjacent cells can transmit during that frame cycle.

Figure 3:
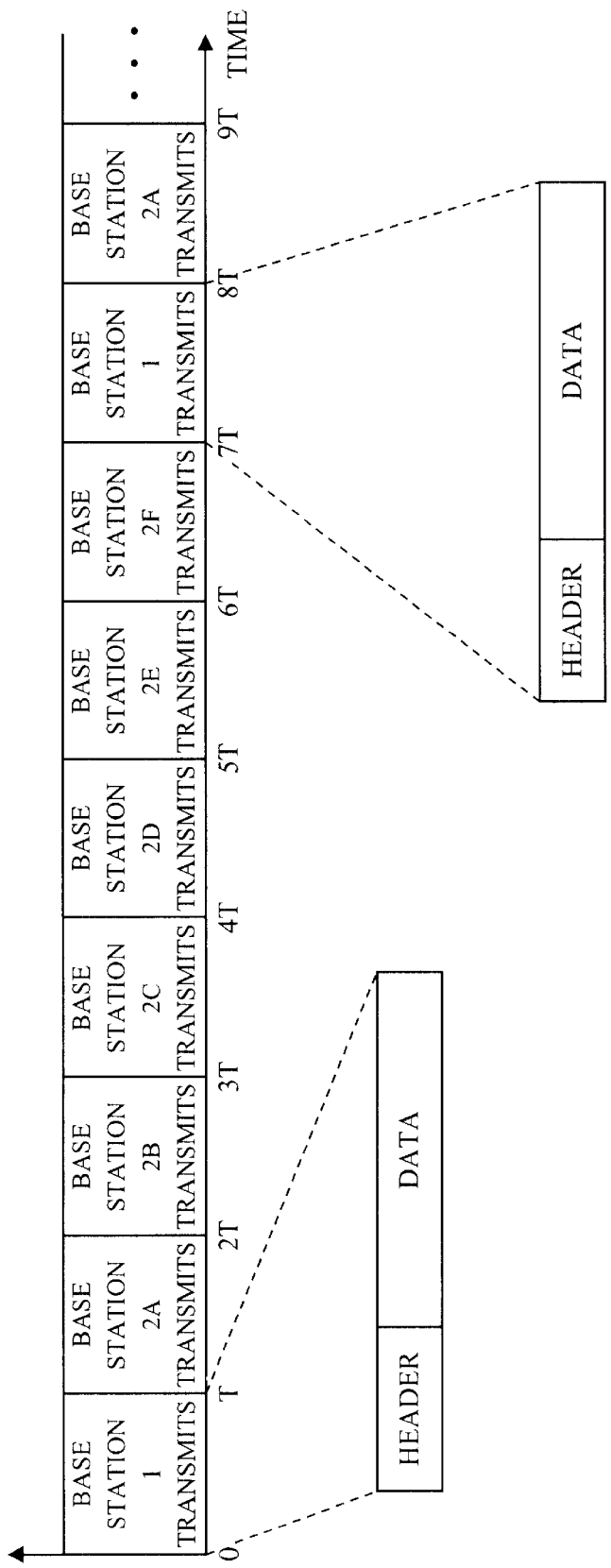
FIG. 3 is an illustration of an exemplary timing diagram and frame formats of the present invention.

Referring to the timing diagram of FIG. 3, BSC 4 sends a transmit message to base station 1 at time 0. In the preferred implementation, BSC 4 sends a message to all base stations of the set of nonadjacent base stations which includes base station 1. In response to that message, base station 1 transmits during the time interval from 0 to T. At time T, BSC 4 sends a transmit message to base station 2A directing base station 2A to transmit during the time interval between time T and time 2T. This process is repeated for each base station of base stations 2B–2F as shown in FIG. 3. At time 7T, BSC 4 sends a message to base station 1 which transmits during the time interval between time 7T and 8T.

Note that when one of base stations 2A–2F are transmitting, it is possible for a subset of base stations F to be transmitting, so long as no two base stations share a common cell boundary. For example, when base station 2A is transmitting then cells 1, 2B, 3F, 3E, 3D and 2F cannot transmit because they are adjacent to cell 2A. However, cells 2C–2F may transmit during this period because they are not adjacent to cell 2A. In a preferred embodiment, the time intervals for transmission are the same so as to reduce the management complexity of coordinating the transmissions of base stations in the system. It should be noted that the use of varying time intervals is foreseen as a possibility.

In the exemplary embodiment, illustrated in FIG. 3, the transmission cycle of cells follows a simple deterministic pattern. It is understood that in simple deterministic transmission cycle, it is not necessary for the base station to operate under the control of BSC 4 because each base station can transmit at predetermined times without control from BSC 4. In a preferred embodiment, the transmission cycle is not determined by a simple deterministic pattern such as the one illustrated in FIG. 3.

In the preferred embodiment, BSC 4 selects a base station or set of nonadjacent base stations which is to transmit in accordance with the amount of information queued for transmission in the base station or set of non adjacent base stations. In the preferred embodiment, BSC 4 monitors the amount of messages that are in a queue maintained by each base station or set of non adjacent base stations and selects the base station to transmit based on the amount of data in the queues.

Within each cell may be a plurality of subscriber stations, each which require data to be transmitted to them by the base station serving that cell. In the exemplary embodiment, the base station designates the identity of the subscriber station to which it is transmitting by means of a header. Referring to FIG. 3, in the first time interval (time 0 to T), base station 1 transmits to a selected subscriber station. In the exemplary embodiment, each frame is 2 ms in duration. The transmitted data is provided with a header that identifies the selected subscriber station.

Figure 7:
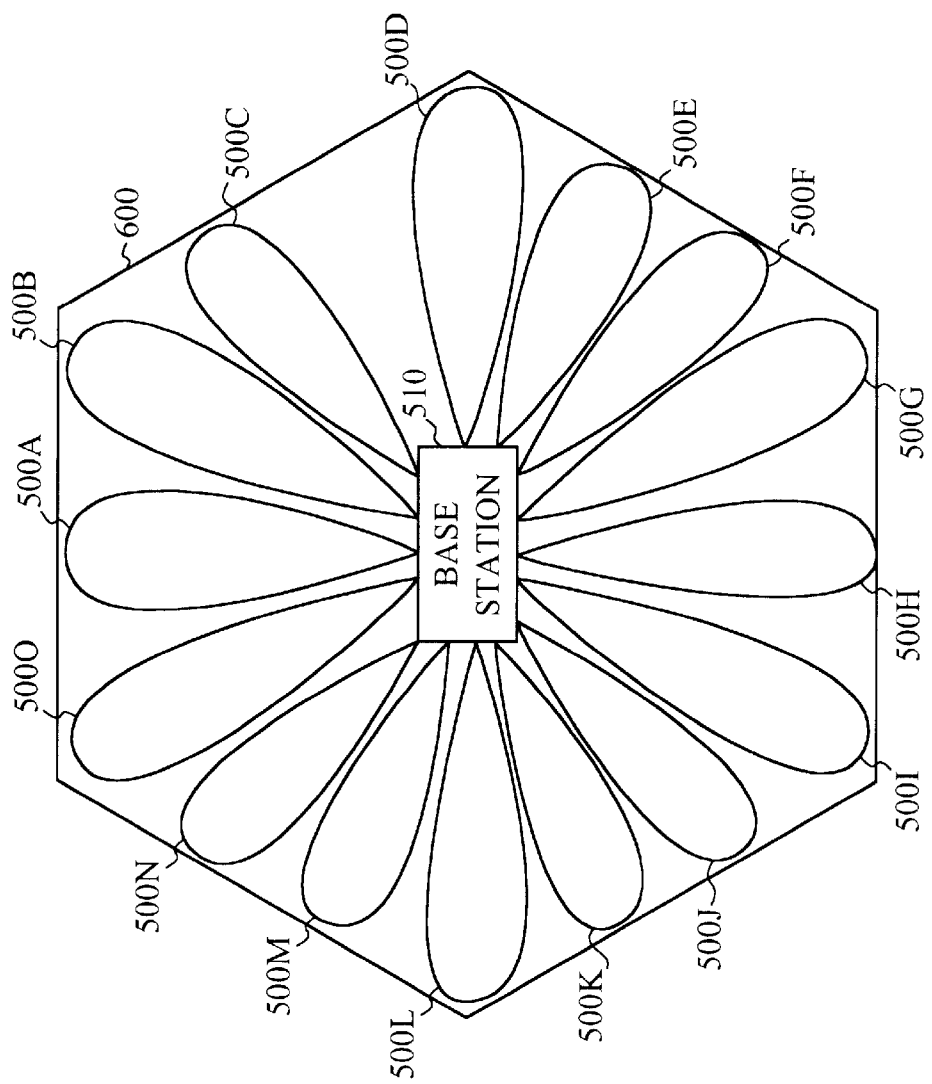
FIG. 7 is an illustration of a cell divided into a large number of narrow sectors.

In an alternative implementation, each cell is divided into narrow sectors wherein each sector can be transmitted to independently of transmitting to any other sector in the cell. This can be accomplished by means of highly directional antennas the design of which is well known in the art. FIG. 7 illustrates a cell 600 served by base station 510, which is divided into sectors 500A–500O. In this embodiment, each cell of the communication system which is similarly sectorized transmits to a random sector or subset of sectors in it. The probability of overlapping simultaneous transmissions from adjacent sectors is small as long as each cell is divided into a sufficiently large number of sectors.

It should be noted, with reference to FIG. 3, that all forward link transmissions are provided at the same energy $E_0$, which would typically be the maximum transmission energy allowed for by government regulations. Equation (2) below illustrates a general link budget analysis which describes the interrelation of parameters in a wireless communication system with fixed power ($E_0$):

$$E_0 = R(bits/s)(dB) + (Eb/No)\text{req}(dB) + L_s(dB) + L_o(dB), \quad (2)$$

where $E_0$ is the fixed transmission energy of the base station, R is the transmission rate, $(Eb/No)_{req}$ is the required signal to noise ratio for a given error rate, $L_s$ is path loss in decibels and $L_o$ is the other loses in decibels. The path loss, $L_s$, depends strongly on the distance between the base station and the subscriber station. In the present invention, either the transmission rate, R, or the required signal to noise ratio, $(Eb/No)_{req}$, is varied based on the distance between the subscriber station and the base station.

Figure 4:
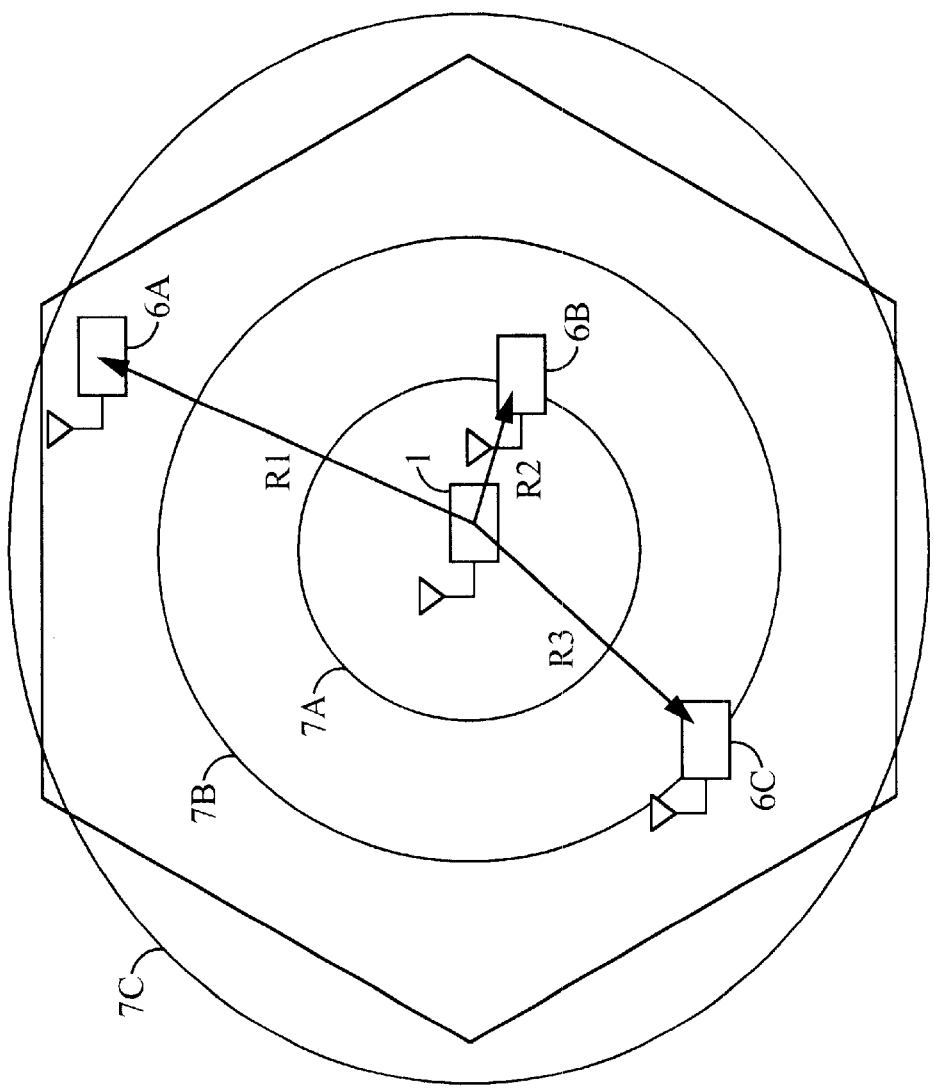
FIG. 4 is a block diagram illustrating a cell in the present invention.

Referring to FIG. 4, three subscriber stations 6A, 6B and 6C are within the cell boundary 10 and as such are served by base station 1. The distances to the subscriber stations 6A, 6B and 6C are r1, r2 and r3, respectively. In an alternative embodiment, an effective distance can be used wherein the effective distance is a metric which is selected in accordance with the path loss between base station 1 and the receiving subscriber station. It will be understood by one of skill in the art that the effective distance is related to but not the same as the physical distance between the base station and the subscriber station. The effective distance is a function both of the physical distance and the course of the propagation path.

Referring back to equation (2), it can be seen that the effects of differences in the path loss ($L_s$) can be offset holding all else constant by changing the value of $(Eb/No)_{req}$. The value $(Eb/No)_{req}$ depends on the error detection and correction techniques employed to protect the transmitted data. The encoding rate refers to the ratio of the number of binary symbols output by the encoder to the number of bits input into the encoder. In general the higher the encoding rate of the transmission system the greater the protection to the transmitted data and the lower the required signal to noise ratio of the signal $(Eb/No)_{req}$. Thus, in a first exemplary embodiment of the present invention, the encoding rate for transmissions to subscriber stations is selected based on the distance between the subscriber station and the base station. Because communication systems are bandwidth limited, the higher encoding rate employed results in lower data throughput of the system.

In equation (2), it can be seen that the effects of differences in the path loss ($L_s$) can, also, be offset by changing the value of the transmission rate, R. The transmission rate, R, is given by the the equation:

$$R = R_S \cdot \log_2 M, \quad (3)$$

where $R_S$ is the number of symbols transmitted and M is the number of symbols in the modulation constellation. Thus, if the distance between the base station and the subscriber station is great, the transmission rate, R, is reduced. In the present invention, the transmission rate is varied by changing the modulation format to one with more or less symbols in the modulation constellation. Whereas, when the distance between the base station and the subscriber station is small, the transmission rate, R, is increased. In the second exemplary embodiment, the symbol rate is set by selection of a modulation format. The information rate is the rate at which actual bits of uncoded user information is transmitted.

Assuming that the physical distance and the effective distances to be closely related, base station 1 will transmit at a lower information rate to subscriber station 6A than it will to subscriber station 6B, since the effective distance to subscriber station 6A is longer than the effective distance to subscriber station 6B.

In the exemplary embodiment, each subscriber station transmits a message indicating its location to the base station serving the cell in which it is located. In an alternative embodiment, methods of positioning which are well known in the art can be used by the communication station to estimate the location of the subscriber station. In an alternative embodiment, the base station uses an effective distance which is determined in accordance with a measurement of the path loss between the base station and the subscriber station. The measurement of path loss can be performed by transmitting a signal of a known power from the base station and measuring the received power at the subscriber station. Similarly, the measurement of path loss can be performed by transmitting a signal of a known power from the subscriber station and measuring the received power at the base station. It should be noted that the references to distance between the base station and the subscriber station apply equally to the physical distance and the effective distance based on measured path loss.

In the present invention the initial encoding rate or modulation format are selected and provided initially during the service set up procedure. Then the distance is tracked. If a sufficient change in the distance results during the service a new encoding rate or modulation format is selected in accordance with the new distance.

In the first exemplary embodiment, the base station selects an encoding rate in accordance with the distance between the base station and the subscriber station. The base station transmits an indication of the selected encoding rate to the receiving subscriber station. The receiving subscriber station, in accordance with the selected encoding rate, selects a decoding format appropriate for use with the selected encoding rate.

In the second exemplary embodiment, the base station selects a modulation format based on the distance between the base station and the subscriber station. The base station then transmits an indication of the selected modulation format to the receiving subscriber station. The receiving subscriber station, in accordance with the selected modulation format, sets up the demodulator appropriate for reception of the signal modulated in accordance with the selected modulation format.

Figure 5:
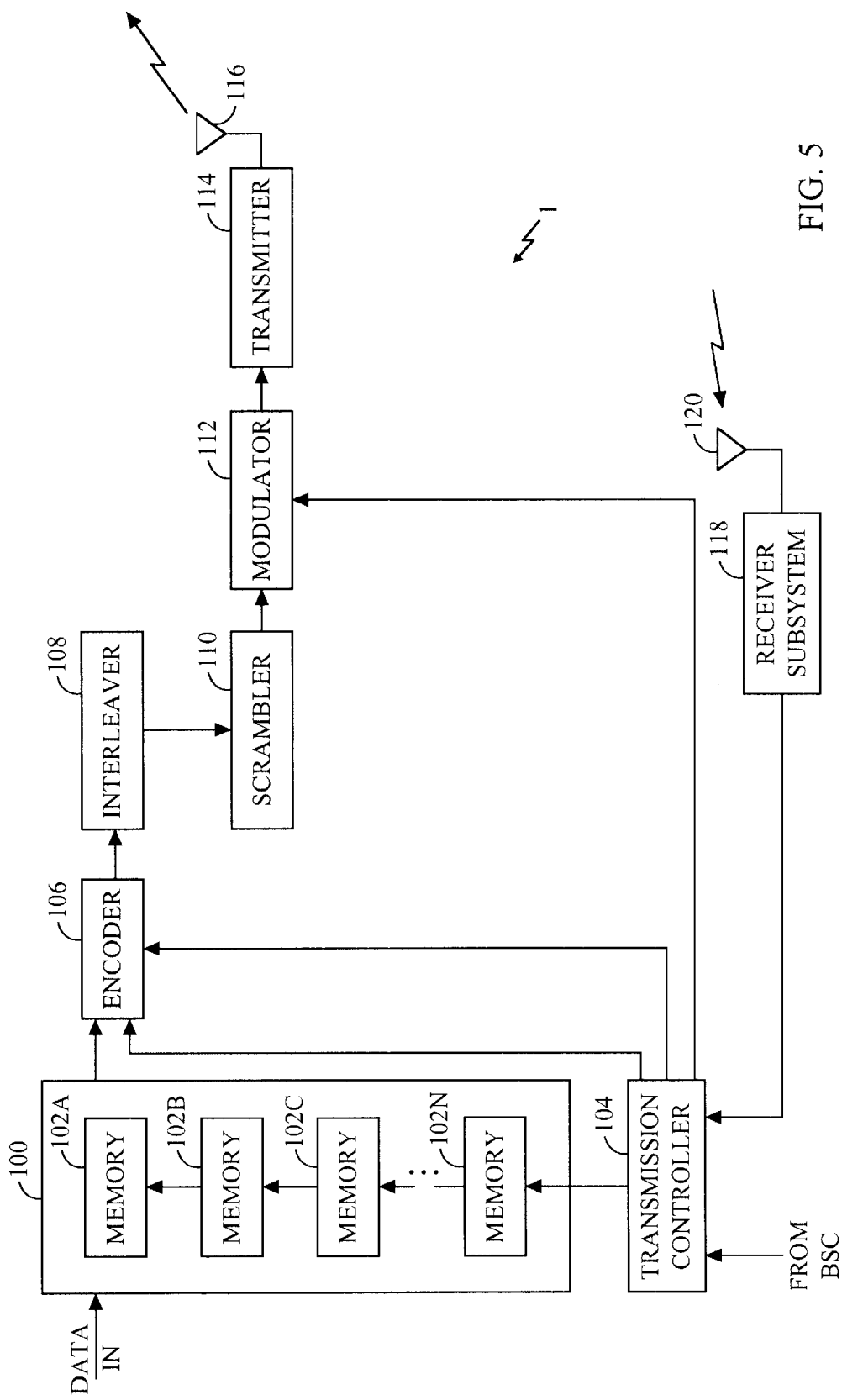
FIG. 5 is a block diagram illustrating the base station of the present invention.
Figure 6:
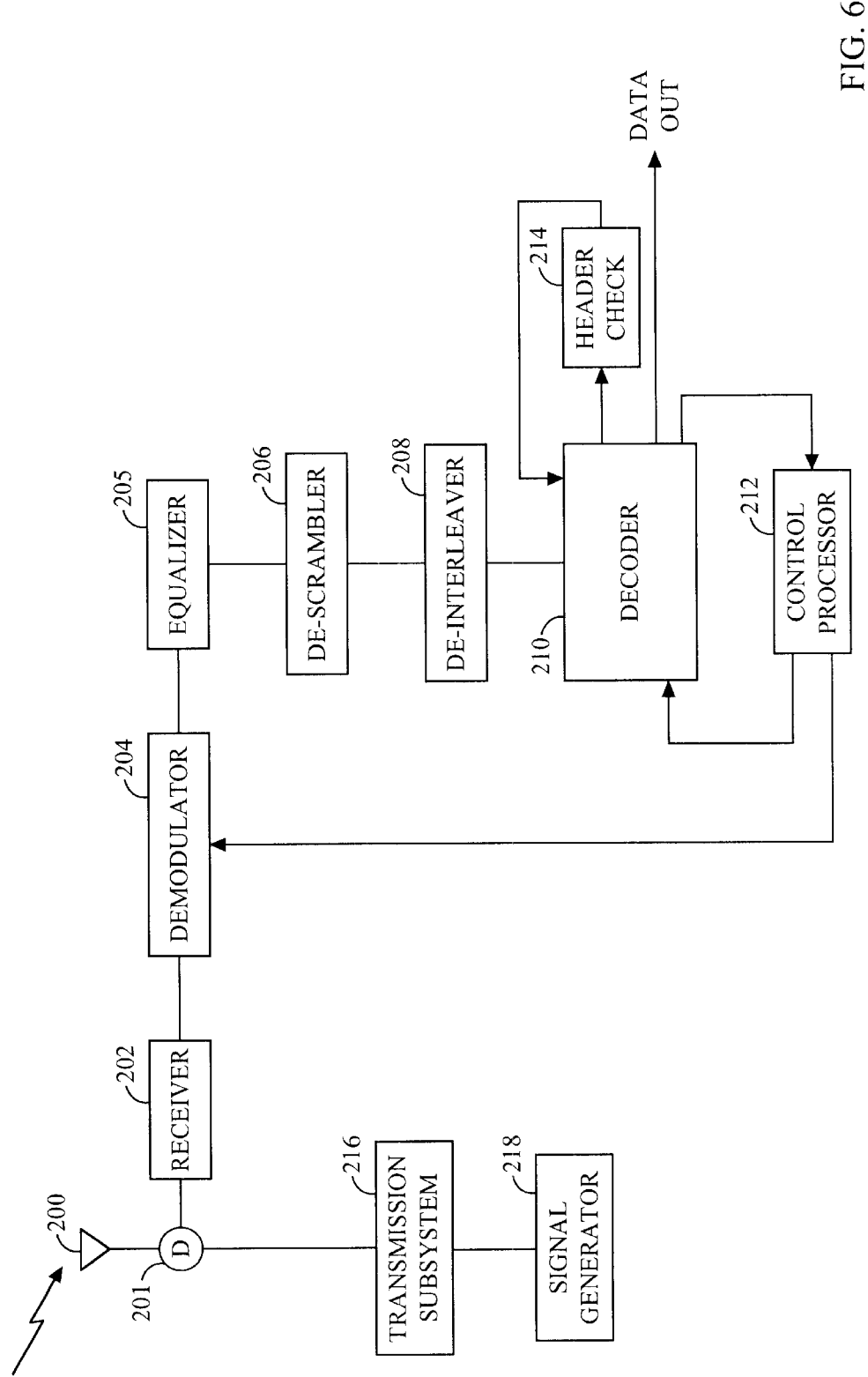
FIG. 6 is a block diagram illustrating the subscriber station of the present invention.

A block diagram of the exemplary embodiment of base station 1 is illustrated in FIG. 5. A block diagram of the exemplary embodiment of subscriber station 6A is illustrated in FIG. 6.

In the first exemplary embodiment, the encoding rate for transmissions to a subscriber station is selected in accordance with the distance between the base station and the subscriber station. Thus, the information rate is varied with the transmission rate, R, held fixed by selecting one of a plurality of encoding rates. First, subscriber station 6A registers with base station 1. In the registration process, mobile station 6A alerts base station 1 of its existence and performs basic system set up tasks as is well known in the art. An exemplary embodiment for device registration is described in detail in U.S. Pat. No. 5,289,527, entitled "MOBILE COMMUNICATION DEVICE REGISTRATION METHOD" which is assigned to the assignee of the present invention and incorporated by reference herein.

In the exemplary embodiment, signal generator 218 of subscriber station 6A generates a message indicating its location and provides the message to transmission subsystem 216. Transmission subsystem 216 encodes, modulates, upconverts and amplifies the message and provides the message through duplexer 201 for transmission through antenna 200. The location message is received by antenna 120 and provided to receiver subsystem 118. Receiver subsystem 118 amplifies, downconverts, demodulates and decodes the received location message and provides it to transmission controller 104.

In the exemplary embodiment of the present invention, the mobile station 6A transmits a message indicating its location to base station 1 during the registration process. In addition, in the exemplary embodiment, subscriber station 6A tracks its own movement and if the distance changes by at least a certain amount, subscriber station 6A transmits an indication of its new location. As described above alternative methods for determining the subscriber station's location or methods based upon the measured the path loss can be employed. In the exemplary embodiment, the location information is provided to transmission controller 104 of base station 1, which computes the distance between base station 1 and subscriber station 6A.

Transmission controller 104 selects an encoding rate in accordance with the distance between subscriber station 6A and base station 1. In a preferred embodiment the distances between base station 1 and subscriber station 6A is quantized in to discrete values as illustrated in FIG. 4. Referring to FIG. 4, all subscriber stations that are located between base station 1 and the circle 7A would receive information at a first encoding rate. All subscriber stations that are located between circle 7A and the circle 7B would receive information at a second encoding rate. All subscriber stations that are located between circle 7B and the circle 7C would receive information at a third encoding rate. For example, referring to FIG. 4, base station 1 may use a rate ½ code when transmitting to subscriber station 6B which is close to base station 1. However, base station 1 may use a rate ⅛ code when transmitting to subscriber station 6A which is far from base station 1.

If the distance between the base station and the subscriber station is great, a higher encoding rate code will be selected. Whereas, when the distance between the base station and the subscriber station is small, a lower encoding rate will be selected. Error correction and detection methods employed at subscriber station 6A will permit a lower required signal to noise ratio, $(Eb/N0)_{req}$, for a given error rate. The lower the rate of coding, the greater the number of errors that can be corrected and the lower the required signal to noise ratio $(Eb/N0)_{req}$.

In the first exemplary embodiment, transmission controller 104 selects the encoding rate as described above and sends an indication of the selected rate to subscriber station 6A. In the exemplary embodiment, the message indicating the encoding rate is transmitted over a paging channel during the registration process. Paging channels are used in wireless communication systems for sending short messages from a base station to a subscriber station. In a preferred embodiment, the communication system permits base station 1 to change the encoding rate by subsequent messages transmitted on the traffic channel. One reason to provide for changing the encoding rate is to allow for changes in the location of subscriber station 6A.

In the exemplary embodiment, the message indicating the selected encoding rate is provided by transmission controller 104 to encoder 106 which encodes the message. The encoded symbols from encoder 106 are provided to interleaver 108, which reorders the symbols in accordance with a predetermined reordering format. In the exemplary embodiment, the interleaved symbols are provided to scrambler 110 which scrambles the interleaved signal in accordance with a CDMA spreading format as described in the aforementioned U.S. Pat. Nos. 4,901,307 and 5,103,459.

The scramble signal is provided to modulator 112 which modulates the signal in accordance with a predetermined modulation format. In the exemplary embodiment, the modulation format for the paging channel is quadrature phase shift keyed (QPSK) modulation. The modulated signal is provided to transmitter 114, where it is upconverted and amplified and transmitted through antenna 116.

The transmitted message indicating the encoding rate is received by antenna 200 and provided to receiver (RCVR) 202. Receiver 202 downconverts and amplifies the received signal and provides the received signal to demodulator 204. Demodulator 204 demodulates the received signal. In the exemplary embodiment, demodulation format for the paging channel is a QPSK demodulation format. In the exemplary embodiment, the demodulated signal is provided to equalizer 205. Equalizer 205 is a channel equalizer which reduces the effects of the propagation environment such as multipath effects. Channel equalizers are well known in the art. The design and implementation of a channel equalizer is disclosed in copending U.S. patent application Ser. No. 08/509, 722 entitled "Adaptive Despreader", filed Jul. 31, 1995, which is assigned to the assignee of the present invention and incorporated by reference herein.

The equalized signal is provided to descrambler 206 which descrambles the signal in accordance with a CDMA despreading format described in detail in the aforementioned U.S. Pat. Nos. 4,901,307 and 5,103,459. The despread symbols are provided to de-interleaver 208 and reordered according to a predetermined de-interleaving format. The reordered symbols are provided to decoder 210 which decodes the message indicating the selected encoding rate and provides the decoded message to control processor 212.

In response to the decoded message, control processor 212 provides a signal to decoder 210 indicating a decoding format that will be used for high speed data transmissions. In the exemplary embodiment, decoder 210 is capable of decoding a received signal in accordance with a plurality of trellis decoding formats where each decoding format corresponds to a corresponding different encoding format.

Referring back to FIG. 5, data to be transmitted to the subscriber stations in cell 1 (subscriber stations 6A, 6B and 6C) is provided to queue 100. The data is stored in queue 100 according to the subscriber station to which it is to be transmitted. The data for subscriber station 6A is stored in memory 102A, the data for subscriber station 6B is stored in memory 102B, the data for subscriber station 6C is stored in memory 102C, and so on. The different memory elements (102A–102N) are purely for illustrative purposes, it will be understood that the queue typically consists of a single memory device and the separate memory devices illustrated simply refer to memory locations within the device.

At the first time interval (t=0), in FIG. 3, BSC 4 sends a message to transmission controller 104 directing base station 1 to transmit. In response transmission controller 104 selects a receiving subscriber station within its coverage area and the period of time the data has been sitting in the queue. In a preferred embodiment, the selection of the receiving subscriber station is based on the amount of data queued for transmission to the subscriber stations in the coverage area. Transmission controller 104 selectively provides a signal to one of memory elements 102A–102N based on its selection of the receiving subscriber station. In addition, in accordance with the receiving subscriber station selected, transmission controller 104 provides a signal to encoder 106 indicating the encoding rate to be used for transmissions to the selected subscriber station.

Transmission controller 104 provides, to encoder 106, a header message identifying the receiving subscriber station. In an exemplary embodiment, encoder 106 encodes the header message using an encoding format to be used to encode the headers for transmissions to all subscriber stations. In an exemplary embodiment, the header information is encoded separately from the rest of the data, so that a subscriber station need not decode the very large amount of data transmitted during the transmission interval if it is not intended for that subscriber station.

Transmission controller 104, then, provides a signal to memory element 102A directing it to provide data and specifying the maximum amount of data that can be transmitted to receiving subscriber station 6A during the predetermined time interval. The predetermined maximum is the maximum of information that can be transmitted to subscriber station 6A within the time interval, T, at the selected encoding rate $(R_{enc})$, for the fixed transmission rate, R, as shown in equation (4) below.

$$\text{Max Data} = (R \cdot T)/R_{enc} \quad (4)$$

In response to the signal from transmission controller 104, memory element 102A provides an amount of data less than or equal to Max Data to encoder 106.

Encoder 106 encodes the data using the selected encoding format and combines the encoded symbols of the header message with the encoded symbols of data. In the exemplary embodiment, encoder 106 is capable of encoding the data at a plurality of convolutional encoding rates. For example encoder 106 may be capable of encoding the data using a rate ½, ⅓, ¼ and ⅕ convolutional encoding formats. Encoding rates can be varied to essentially any rate by using a combination of encoders typically used and data puncturing. Encoder 106 provides the encoded symbols to interleaver 108.

Interleaver 108 reorders the symbols in accordance with a predetermined reordering format and provides the reordered symbols to scrambler 110. Scrambler 110 scrambles the symbols in accordance with a predetermined CDMA spreading format and provides the spread symbols to modulator 112. It should be noted that because only one subscriber station 6A is being transmitted to, the use of scrambler 110 is for the purposes of scrambling the data for security purposes and to increase the signal's immunity to narrow band noise and not for the purpose of multiple access communications.

Modulator 112 modulates the spread symbols in accordance with a predetermined modulation format. In the exemplary embodiment, modulator 112 is a 16-ary QAM modulator. Modulator 112 provides the modulated symbols to transmitter (TMTR) 114. Transmitter 114 upconverts and amplifies the signal and transmits the signal through antenna 116.

The transmitted signal is received by subscriber station 6A at antenna 200. The received signal is provided to receiver (RCVR) 202. Receiver 202 downconverts and amplifies the received signal. The received signal is provided to demodulator 204 which demodulates the signal in accordance with a predetermined demodulation format. The demodulated signal is provided to equalizer 205 which is a channel equalizer as described above. The channel equalized signal is provided to descrambler 206 which descrambles the signal in accordance with a predetermined CDMA despreading format as described above. De-interleaver 208 reorders the despread symbols and provides them to decoder 210.

In the exemplary embodiment, decoder 210 first decodes the header message contained in the reordered symbols. The header message is provided to header check means 214 which verifies that the information being transmitted is intended for subscriber station 6A. If the data is intended for subscriber station 6A, then the rest of the data is decoded. When the header indicates the data is intended for the user of subscriber station 6A, header check 214 sends a signal to decoder 210 indicating that the remaining information should be decoded. In an alternative embodiment, all information is decoded and then the header is checked after the decoding process.

Decoder 210 decodes the symbols in accordance with the selected decoding format from control processor 212. In the exemplary embodiment, decoder 210 decodes the reordered symbols in accordance with one of a plurality of trellis decoding formats selected based on the selected encoding rate. The decoded symbols are then provided to the user of subscriber station 6A.

In the second exemplary embodiment, transmission controller 104 selects the modulation format in accordance with the distance between the base station and the mobile station. Base station 1 sends an indication of the selected modulation format to the subscriber station. The modulation format directly effects the transmission rate R. Referring to equation (2), all parameters are fixed in this case except the path loss, $L_s$, and the transmission rate, R. Higher transmission rates (R) are transmitted using a modulation format that contains a larger set of modulation symbols. For example, 28-ary quadrature amplitude modulation (QAM) can be used for transmission to subscriber station near the base station. Whereas 16-ary QAM modulation would be used for transmission to subscriber stations further from the base station.

In the exemplary embodiment, subscriber station 6A transmits a message indicating its location to base station 1. In response, base station 1 selects a modulation format. As described with respect to the previous embodiment, the distances computed by transmission controller 104 are quantized. The modulation format is selected in accordance with the quantized distances. Referring to FIG. 4, all subscriber stations that are located between base station 1 and the circle 7A would receive information using a first modulation format. All subscriber stations that are located between circle 7A and the circle 7B would receive information using a second modulation format. All subscriber stations that are located between circle 7B and the circle 7C would receive information at using a third modulation format. For example, referring to FIG. 4, base station 1 may use a QPSK modulation format when transmitting to subscriber station 6B which is close to base station 1. By contrast, base station 1 may use a 64-ary Quadrature Amplitude Modulation (QAM) when transmitting to subscriber station 6A which is far from base station 1. In the exemplary embodiment, the message indicating the selected modulation format is transmitted over a paging channel during the registration process. Again, in a preferred embodiment, the communication system permits base station 1 to change the modulation format by subsequent messages transmitted on the paging channel.

The transmitted signal indicating the modulation format is received by subscriber station 6A as described above and provided to control processor 212. Control processor 212 provides a signal to demodulator 204 indicating a demodulation format that will be used. Demodulator 204, of the second exemplary embodiment, is capable of demodulating a received signal in accordance with a plurality of demodulation formats. In response to the signal from control processor 212, an appropriate demodulation format is selected.

Referring back to FIG. 5, data to be transmitted to the subscriber stations in cell 1 (subscriber stations 6A, 6B and 6C) is provided to queue 100. At the first time interval (t=0), BSC 4 sends a message to transmission controller 104 directing base station 1 to transmit. In response to the signal, transmission controller 104 selects a receiving subscriber station as described above. Transmission controller 104 selectively provides a signal to one of memory elements 102A–102N based on its selection of the subscriber station. In addition, in accordance with the subscriber station selected, transmission controller 104 provides a signal indicating the selected modulation format to modulator 112.

Transmission controller 104 provides, to encoder 106, a header message that identifies the subscriber station to which the data is being sent. Encoder 106 encodes the header message as described above. Transmission controller 104, then, provides a signal to memory element 102A directing it to provide data and specifying the maximum amount of data that can be transmitted to receiving subscriber station 6A during the predetermined time interval. The predetermined maximum is the maximum of information that can be transmitted to subscriber station 6A within the time interval, T, at the selected rate as shown in equation (4) below.

$$\text{Max Data} = M \cdot R_S \cdot T, \quad (5)$$

where M is the number of modulation symbols used in the selected modulation format and $R_S$ is the symbol rate. In response to the signal from transmission controller 104, memory element 102A provides an amount of data less than or equal to Max Data to encoder 106.

In the second exemplary embodiment, encoder 106 encodes the data at a fixed encoding rate and combines the encoded symbols of the header message with the encoded symbols of data. Encoder 106 provides the encoded symbols to interleaver 108. Interleaver 108 reorders the symbols in accordance with a predetermined reordering format and provides the reordered symbols to scrambler 110. Scrambler 110 scrambles the symbols in accordance with a predetermined CDMA spreading format and provides the scrambled symbols to modulator 112.

Modulator 112 modulates the scrambled symbols in accordance with the selected modulation format. In the exemplary embodiment modulator 112 is capable of mapping the scrambled symbols into modulation symbols according to a plurality of modulation formats. Modulator 112 provides the modulated symbols to transmitter (TMTR) 114. Transmitter 114 upconverts and amplifies the signal and transmits the signal through antenna 116.

The transmitted signal is received by subscriber station 6A at antenna 200. The received signal is provided to receiver (RCVR) 202. Receiver 202 downconverts and amplifies the received signal. The received signal is provided to demodulator 204 which demodulates the signal in accordance with the selected demodulation format. The demodulated signal is provided to equalizer 205 which channel equalizes the received signal as described above. The equalized sign is provided to descrambler 206 which descrambles the signal in accordance with a predetermined CDMA despreading format. De-interleaver 208 reorders the descrambled symbols and provides them to decoder 210.

In the exemplary embodiment, decoder 210 first decodes the header message contained in the reordered symbols. The header message is provided to header check means 214 which verifies that the information being transmitted is intended for subscriber station 6A. If the data is intended for subscriber station 6A then the rest of the data is decoded. When the header indicates the data is intended for the user of subscriber station 6A, header check 214 sends a signal to decoder 210 indicating that the remaining information should be decoded. In an alternative embodiment, all information is decoded and then the header is checked after the decoding process is completed. Decoder 210 decodes the symbols. The decoded symbols are then provided to the user of subscriber station 6A.

It should be noted that systems that use both varying the encoding rate and using the technique of varying the modulation format simultaneously are envisioned.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for a communication system, comprising:
   selecting an encoding rate for each of fixed and predetermined power level transmissions of digital data from a base station to each mobile station of a plurality of mobile stations in said communication system;
   selecting an amount of data for each of said fixed and predetermined power level transmissions from said base station to each of said plurality of mobile stations;
   selecting a modulation format for each of said fixed and predetermined power level transmissions from said base station to each of said plurality of mobile stations;
   encoding and modulating said selected amount of data in accordance with said selected encoding data rate and said selected modulation format for each of said plurality of mobile stations;
   transmitting from said base station, encoded and modulated data, to each of said plurality of mobile stations in non-overlapping transmission bursts at said fixed and predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each of said plurality of mobile stations is based on an effective link budget for each of said plurality of mobile stations, wherein said link budget includes a parameter indicating transmission set at said fixed and predetermined power level.

2. The method as recited in claim 1 wherein said effective link budget for each of said plurality of mobile stations is based on an effective distance as measured by an effective transmission path loss between said base station and each of said plurality of mobile stations.

3. An apparatus for a communication system, comprising:
   a controller for selecting an encoding rate for each of fixed and predetermined power level transmissions of digital data from a base station to each mobile station of a plurality of mobile stations in said communication system, for selecting an amount of data for each of said fixed and predetermined power level transmissions from said base station to each of said plurality of mobile stations and for selecting a modulation format for each said fixed and predetermined power level transmissions from said base station to each of said plurality of mobile stations;
   a transmitter, at said base station, for encoding and modulating said selected amount of data in accordance with said selected encoding data rate and said selected modulation format for each of said plurality of mobile stations and for transmitting, encoded and modulated data, to each of said plurality of mobile. stations in non-overlapping transmission bursts at said fixed predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each of said plurality of mobile stations is based on an effective link budget for each of said plurality of mobile stations, wherein said link budget includes a parameter indicating transmission set at said fixed and predetermined power level.

4. The apparatus as recited in claim 3 wherein said effective link budget for each of said plurality of mobile stations is based on an effective distance as measured by an effective transmission path loss between said base station and each of said plurality of mobile stations.

5. A method for a communication system, comprising:
   selecting an encoding rate for each of fixed and predetermined power level transmissions of digital data from each base station of a plurality of base stations to each mobile station of a plurality of mobile stations in said communication system;
   selecting an amount of data for each fixed and predetermined power level transmissions from each base station of said plurality of base stations;

selecting a modulation format for each fixed and predetermined power level transmissions from each base station of said plurality of base stations to each of said plurality of mobile stations;

encoding and modulating said selected amount of data in accordance with said selected encoding data rate and said selected modulation format for each mobile station of said plurality of mobile stations;

transmitting, from each of said plurality of base stations, encoded and modulated data, to each mobile station of said plurality of mobile stations in non-overlapping transmission bursts at said fixed predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each of said plurality of mobile stations is based on an effective link budget for each of said plurality of mobile stations, wherein said link budget includes a parameter indicating transmission set at said fixed and predetermined power level.

6. The method as recited in claim 5 wherein said effective link budget for each of said plurality of mobile stations is based on an effective distance as measured by an effective transmission path loss between said base station and each of said plurality of mobile stations.

7. An apparatus for a communication system, comprising:

a controller for selecting an encoding rate for each of fixed and predetermined power level transmissions of digital data from each base station of a plurality of base stations to each mobile station of a plurality of mobile stations in said communication system, for selecting an amount of data for each said fixed and predetermined power level transmissions of digital data from each base station to each of said plurality of mobile stations and for selecting a modulation format for each said fixed and predetermined power level transmissions of digital data from each base station of said plurality of base stations to each of said plurality of mobile stations;

a transmitter for encoding and modulating said selected amount of data in accordance with said selected encoding data rate and said selected modulation format for each mobile station of said plurality of mobile stations and for transmitting, encoded and modulated data, from said each of said plurality of base stations to each mobile station of said plurality of mobile stations in non-overlapping transmission bursts at said fixed predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each mobile station of said plurality of mobile stations is based on an effective link budget for each of said plurality of mobile stations, wherein said link budget includes a parameter indicating transmission set at said fixed and predetermined power level.

8. The apparatus as recited in claim 7 wherein said effective link budget for each mobile station of said plurality of mobile stations is based on an effective distance as measured by an effective transmission path loss between said base station and each of said plurality of mobile stations.

* * * * *

(12) EX PARTE REEXAMINATION CERTIFICATE (6934th)
United States Patent
Zehavi

(10) Number: US 6,496,543 C1
(45) Certificate Issued: Jul. 14, 2009

(54) METHOD AND APPARATUS FOR PROVIDING HIGH SPEED DATA COMMUNICATIONS IN A CELLULAR ENVIRONMENT

(75) Inventor: Ephraim Zehavi, Haifa (IL)

(73) Assignee: Qualcomm Incorporated, San Diego, CA (US)

Reexamination Request:
No. 90/008,533, Mar. 16, 2007

Reexamination Certificate for:
Patent No.: 6,496,543
Issued: Dec. 17, 2002
Appl. No.: 08/741,320
Filed: Oct. 29, 1996

(51) Int. Cl.
*H04Q 7/22* (2006.01)
*H04Q 7/38* (2006.01)
*H04L 1/00* (2006.01)

(52) U.S. Cl. .................. 375/295; 375/358; 375/377
(58) Field of Classification Search .................. None
See application file for complete search history.

(56) References Cited

U.S. PATENT DOCUMENTS 5,491,727 A 2/1996 Petit 5,862,171 A 1/1999 Mahany
6,134,220 A 10/2000 Le Strat et al.

FOREIGN PATENT DOCUMENTS

WO WO 95/28814 10/1995

*Primary Examiner*—Ryan R Yang

(57) ABSTRACT

A method and apparatus for transmitting digital data in a cellular environment. Adjacent cells of the cellular system are prevented from simultaneously transmitting data. Because the noise from transmissions of adjacent cells is a primary source of interference, the transmission rate of power limited base stations can be dramatically increased when the noise from adjacent cells is eliminated. The transmissions to each subscriber station are made at a fixed transmission power level. However, the data rate of transmitted signals differs from one subscriber station to another depending the path loss differences. In a first exemplary embodiment, the data rate of transmissions to a subscriber station is determined by selecting an encoding rate for the transmitted signal while holding the symbol rate constant. In a second exemplary embodiment, the data rate of transmissions to a subscriber station is determined by selection a modulation format for the transmitted signal which directly changes the symbol rate of transmission to a subscriber station.

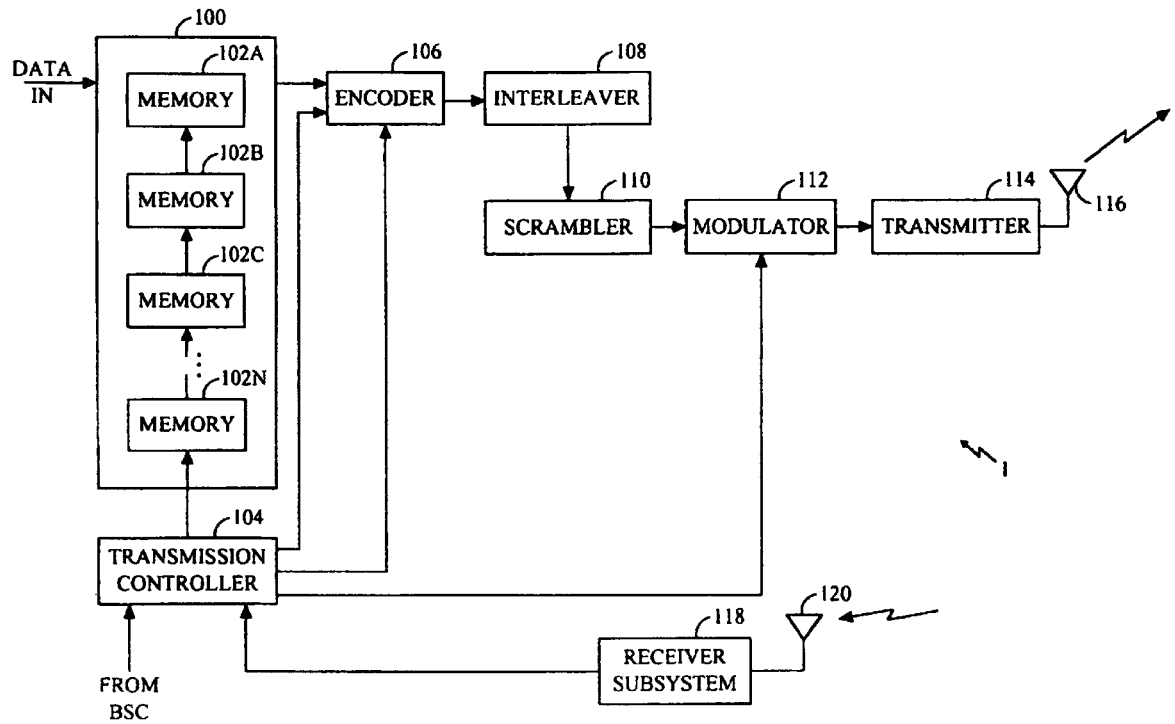

US 6,496,543 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 5 and 7 are determined to be patentable as amended.

Claims 2, 4, 6 and 8, dependent on an amended claim, are determined to be patentable.

1. A method for a communication system, comprising:
   selecting an encoding rate for each of fixed and predetermined power level transmissions of digital data from a base station to each mobile station of a plurality of mobile stations in said communication system;
   selecting an amount of data for each of said fixed and predetermined power level transmissions from said base station to each of said plurality of mobile stations;
   selecting a modulation format for each of said fixed and predetermined power level transmissions from said base station to each of said plurality of mobile stations;
   encoding and modulating said selected amount of data in accordance with said selected encoding data rate and said selected modulation format for each of said plurality of mobile stations;
   transmitting from said base station, encoded and modulated data, to each of said plurality of mobile stations in non-overlapping transmission bursts at said fixed and predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each of said plurality of mobile stations is based on an effective link budget for each of said plurality of mobile stations, wherein said *effective* link budget includes a parameter indicating transmission set at said fixed and predetermined power level.

3. An apparatus for a communication system, comprising:
   a controller for selecting an encoding rate for each of fixed and predetermined power level transmissions of digital data from a base station to each mobile station of a plurality of mobile stations in said communication system, for selecting an amount of data for each of said fixed and predetermined power level transmissions from said base station to each of said plurality of mobile stations and for selecting a modulation format for each said fixed and predetermined power level transmissions from said base station to each of said plurality of mobile stations;
   a transmitter, at said base station, for encoding and modulating said selected amount of data in accordance with said selected encoding data rate and said selected modulation format for each of said plurality of mobile stations and for transmitting, encoded and modulated data, to each of said plurality of mobile stations in non-overlapping transmission bursts at said fixed predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each of said plurality of mobile stations is based on an effective link budget for each of said plurality of mobile stations, wherein said *effective* link budget includes a parameter indicating transmission set at said fixed and predetermined power level.

5. A method for a communication system, comprising:
   selecting an encoding rate for each of fixed and predetermined power level transmissions of digital data from each base station of a plurality of base stations to each mobile station of a plurality of mobile stations in said communication system;
   selecting an amount of data for each fixed and predetermined power level transmissions from each base station of said plurality of base stations;
   selecting a modulation format for each fixed and predetermined power level transmissions from each base station of said plurality of base stations to each of said plurality of mobile stations;
   encoding and modulating said selected amount of data in accordance with said selected encoding data rate and said selected modulation format for each mobile station of said plurality of mobile stations;
   transmitting, from each of said plurality of base stations, encoded and modulated data, to each mobile station of said plurality of mobile stations in non-overlapping transmission bursts at said fixed predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each of said plurality of mobile stations is based on an effective link budget for each of said plurality of mobile stations, wherein said *effective* link budget includes a parameter indicating transmission set at said fixed and predetermined power level.

7. An apparatus for a communication system, comprising:
   a controller for selecting an encoding rate for each of fixed and predetermined power level transmissions of digital data from each base station of a plurality of base stations to each mobile station of a plurality of mobile stations in said communication system, for selecting an amount of data for each of said fixed and predetermined power level transmissions of digital data from each base station to each of said plurality of mobile stations and for selecting a modulation format for each said fixed and predetermined power level transmissions of digital data from each base station of said plurality of base stations to each of said plurality of mobile stations;
   a transmitter for encoding and modulating said selected amount of data in accordance with said selected encoding data rate and said selected modulation format for each mobile station of said plurality of mobile stations and for transmitting, encoded and modulated data, from said each of said plurality of base stations to each mobile station of said plurality of mobile stations in non-overlapping transmission bursts at said fixed predetermined power level, wherein said non-overlapping transmission bursts are over predefined and fixed duration time frames, wherein at least one of said selected encoding rate, said selected modulation format and said selected amount of data for each of said fixed and predetermined power level transmissions from said base station to each mobile station of said plurality of mobile stations is based on an effective link budget for each of said plurality of mobile stations, wherein said *effective link budget* includes a parameter indicating transmission set at said fixed and predetermined power level.

\* \* \* \* \*